United States Patent
Si et al.

(10) Patent No.: US 11,706,762 B2
(45) Date of Patent: Jul. 18, 2023

(54) CODEBOOK FEEDBACK PROCESSING METHOD, DEVICE, APPARATUS AND MEDIUM

(71) Applicant: DATANG MOBILE COMMUNICATIONS EQUIPMENT CO., LTD., Beijing (CN)

(72) Inventors: Qianqian Si, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/920,388

(22) PCT Filed: Apr. 16, 2021

(86) PCT No.: PCT/CN2021/087747
§ 371 (c)(1),
(2) Date: Oct. 20, 2022

(87) PCT Pub. No.: WO2021/213268
PCT Pub. Date: Oct. 28, 2021

(65) Prior Publication Data
US 2023/0118376 A1    Apr. 20, 2023

(30) Foreign Application Priority Data
Apr. 20, 2020  (CN) .......................... 202010312013.8

(51) Int. Cl.
*H04L 1/1812* (2023.01)
*H04W 72/12* (2023.01)
*H04W 72/1273* (2023.01)

(52) U.S. Cl.
CPC ....... *H04W 72/1273* (2013.01); *H04L 1/1812* (2013.01)

(58) Field of Classification Search
CPC .................. H04W 72/1273; H04L 1/1812
See application file for complete search history.

(56) References Cited

U.S. PATENT DOCUMENTS 10,686,562 B2 *  6/2020  Xiao ................ H04W 72/23
11,290,217 B2 *  3/2022  Gao ................. H04L 1/1854
(Continued)

FOREIGN PATENT DOCUMENTS

CN   110149173 A   8/2019
CN   110324117 A   10/2019
(Continued)

OTHER PUBLICATIONS

International Search Report (ISR) dated Jul. 14, 2021 for Application No. PCT/CN2021/087747 and its English Translation provided by WIPO.
(Continued)

*Primary Examiner* — Ahmed Elallam
(74) *Attorney, Agent, or Firm* — Ladas & Parry, LLP

(57) ABSTRACT

This disclosure provides a codebook feedback processing method, a device, an apparatus and a medium. The method includes: determining, by a terminal, based on a quantity of repeated transmissions of a repeatedly transmitted semi-persistent scheduling (SPS) physical downlink shared channel (PDSCH), whether there is at least one valid transmission in corresponding transmission opportunities; and determining, by the terminal, based on whether there is at least one valid transmission, whether a feedback bit position is reserved for the SPS PDSCH in a feedback codebook. A base station determines, based on whether there is at least one valid transmission, whether a feedback bit position is reserved for the SPS PDSCH in the feedback codebook.

20 Claims, 3 Drawing Sheets

(56) References Cited

U.S. PATENT DOCUMENTS

| | | | |
|---|---|---|---|
| 2021/0021386 A1 | 1/2021 | Gao | |
| 2021/0050948 A1* | 2/2021 | Gao | H04L 1/1812 |
| 2021/0099255 A1 | 4/2021 | Gao | |
| 2021/0336726 A1 | 10/2021 | Takeda et al. | |
| 2022/0095337 A1* | 3/2022 | Wang | H04W 72/1273 |
| 2022/0272734 A1* | 8/2022 | Si | H04W 72/20 |
| 2022/0385412 A1* | 12/2022 | Zhang | H04L 1/1812 |

FOREIGN PATENT DOCUMENTS

| | | | | |
|---|---|---|---|---|
| CN | 110324126 A | | 10/2019 | |
| CN | 112804033 A | * | 5/2021 | |
| CN | 113497680 A | * | 10/2021 | |
| CN | 110351018 B | * | 12/2021 | H04L 1/1607 |
| WO | 2017078465 A1 | | 5/2017 | |
| WO | 2020026296 A | | 2/2020 | |

OTHER PUBLICATIONS

Written Opinion (WOSA) dated Jul. 14, 2021 for Application No. PCT/CN2021/087747, and its English Translation provided by WIPO.

"Feature lead summary#1 of HARQ enhancements for NR-U," 3GPP TSG RAN WG1 Meeting #99, R1-1913288, Reno, USA, Nov. 18-22, 2019, Agenda item:7.2.2.2.3, Source Huawei, all pages.

"Remaining issues in SPS enhancements," 3GPP TSG RAN WG1 #100, R1-2002335, e-Meeting, Apr. 20-Apr. 30, 2020, Agenda Item: 7.2.5.7, Source: Apple Inc., all pages.

First Office Action for Chinese Patent Application 202010312013.8 dated Apr. 20, 2022, and its English translation provided by Global dossier.

* cited by examiner

CODEBOOK FEEDBACK PROCESSING METHOD, DEVICE, APPARATUS AND MEDIUM

CROSS-REFERENCE TO RELATED APPLICATIONS

The present application is a U.S. national phase application of PCT Application No. PCT/CN2021/087747 filed on Apr. 16, 2021, which claims a priority to the Chinese patent application No. 202010312013.8 filed in China on Apr. 20, 2020, the disclosures of which are incorporated herein by reference in their entireties.

TECHNICAL FIELD

The present disclosure relates to the field of wireless communication technology, in particular to a codebook feedback processing method, a device, an apparatus and a medium.

BACKGROUND

Conventionally, in a new radio (NR) communication system, simultaneous configuration of multiple semi-persistent scheduling (SPS) configurations in a single carrier group is supported.

The disadvantage of the related art is that: when a hybrid automatic repeat request-acknowledgement (HARQ-ACK) feedback about an SPS physical downlink shared channel (PDSCH) is performed, a situation that the feedback information about the SPS PDSCH cannot be included in a corresponding feedback codebook may occur.

SUMMARY

The present disclosure provides a codebook feedback processing method, a device, an apparatus, and a medium to solve the problem that the feedback information about the SPS PDSCH cannot be included in the corresponding feedback codebook.

An embodiment of the present disclosure provides a codebook feedback processing method, including:

determining, by a terminal, based on a quantity of repeated transmissions of a repeatedly transmitted SPS PDSCH, whether there is at least one valid transmission in transmission opportunities corresponding to the repeatedly transmitted SPS PDSCH;

determining, by the terminal, based on whether there is at least one valid transmission, whether to reserve a feedback bit position for the SPS PDSCH in a feedback codebook.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether to reserve the feedback bit position for the SPS PDSCH in the feedback codebook includes:

in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or, in case that it is determined based on the quantity of repeated transmissions that there is no valid transmission, not reserving a feedback bit position for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

An embodiment of the present disclosure provides a codebook feedback processing method, including:

determining, by a base station, based on a quantity of repeated transmissions of a repeatedly transmitted SPS PDSCH, whether there is at least one valid transmission in transmission opportunities corresponding to the repeatedly transmitted SPS PDSCH;

determining, by the base station, based on whether there is at least one valid transmission, whether a feedback bit position is reserved for the SPS PDSCH in a feedback codebook.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether the feedback bit position is reserved for the SPS PDSCH in the feedback codebook includes:

in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or, in case that it is determined based on the quantity of repeated transmissions that there is no valid transmission, no feedback bit position is reserved for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, the feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

An embodiment of the present disclosure provides a terminal, including:

a processor, configured to read a program in a memory to implement the following process:

determining, based on a quantity of repeated transmissions of a repeatedly transmitted SPS PDSCH, whether there is at least one valid transmission in transmission opportunities corresponding to the repeatedly transmitted SPS PDSCH;

determining, based on whether there is at least one valid transmission, whether to reserve a feedback bit position for the SPS PDSCH in a feedback codebook;

a transceiver, configured to receive and transmit data under the control of the processor.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether to reserve the feedback bit position for the SPS PDSCH in the feedback codebook includes:

in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or, in case that it is determined based on the quantity of repeated transmissions that there is no valid transmission, not reserving a feedback bit position for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

An embodiment of the present disclosure provides a base station, including:

a processor, configured to read a program in a memory to implement the following process:

determining, based on a quantity of repeated transmissions of a repeatedly transmitted SPS PDSCH, whether there is at least one valid transmission in transmission opportunities corresponding to the repeatedly transmitted SPS PDSCH;

determining, based on whether there is at least one valid transmission, whether a feedback bit position is reserved for the SPS PDSCH in a feedback codebook;

a transceiver, configured to receive and transmit data under the control of the processor.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether the feedback bit position is reserved for the SPS PDSCH in the feedback codebook includes:

in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or, in case that it is determined based on the quantity of repeated transmissions that there is no valid transmission, no feedback bit position is reserved for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

An embodiment of the present disclosure provides a codebook feedback processing apparatus, including:

a valid transmission determination module, configured to determine, based on a quantity of repeated transmissions of a repeatedly transmitted SPS PDSCH, whether there is at least one valid transmission in transmission opportunities corresponding to the repeatedly transmitted SPS PDSCH;

a reservation module, configured to determine, based on whether there is at least one valid transmission, whether to reserve a feedback bit position for the SPS PDSCH in a feedback codebook.

An embodiment of the present disclosure provides a codebook feedback processing apparatus, including:

a determination module, configured to determine, based on a quantity of repeated transmissions of a repeatedly transmitted SPS PDSCH, whether there is at least one valid transmission in transmission opportunities corresponding to the repeatedly transmitted SPS PDSCH;

a reservation determination module, configured to determine, based on whether there is at least one valid transmission, whether a feedback bit position is reserved for the SPS PDSCH in a feedback codebook.

An embodiment of the present disclosure provides a computer-readable storage medium storing a computer program, wherein the computer program is configured to be executed to implement the above codebook feedback processing methods.

The beneficial effects of the present disclosure are as follows.

In the technical solution provided by the embodiments of the present disclosure, it is determined, based on a quantity of repeated transmissions of a repeatedly transmitted SPS PDSCH, whether there is at least one valid transmission in transmission opportunities corresponding to the repeatedly transmitted SPS PDSCH; and then it is determined, based on whether there is at least one valid transmission, whether to reserve a feedback bit position for the SPS PDSCH in a feedback codebook. Since the feedback bit position is reserved in the feedback codebook when there is at least one valid transmission, the feedback performance corresponding to the repeatedly transmitted SPS PDSCH is guaranteed; furthermore, system transmission efficiency is improved and unnecessary retransmissions are reduced.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation of the present disclosure.

DETAILED DESCRIPTION

Figure 1:
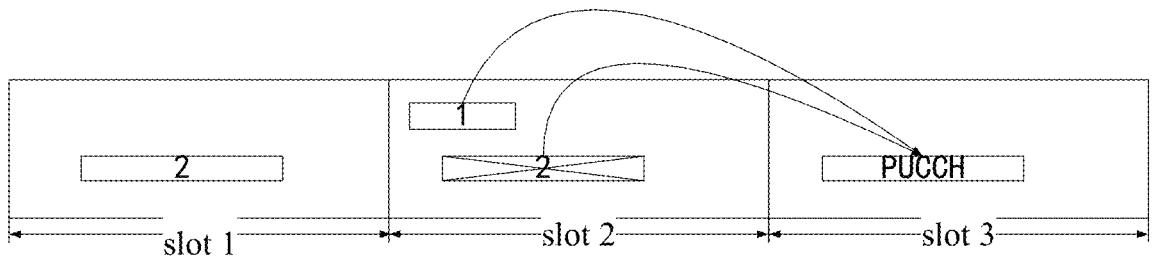
FIG. 1 is a schematic diagram illustrating a situation where a repeatedly transmitted SPS PDSCH overlaps with an SPS PDSCH with a smaller number in the last slot of the repeatedly transmitted SPS PDSCH according to an embodiment of the present disclosure.

During research, the following has been noticed.

Currently, in NR communication systems, simultaneous configuration of multiple SPS configurations in one carrier group is supported, which may lead to a situation where multiple SPS PDSCHs overlap with each other in one carrier. It is stipulated in protocol that the user equipment (UE) only demodulates an SPS PDSCH with the smallest SPS configuration index number. When generating the HARQ-ACK codebook, if the HARQ-ACK codebook only includes the feedback information about the SPS PDSCH, firstly, the UE finds, according to the HARQ-ACK feedback timing (K1), all slots corresponding to the physical uplink control channel (PUCCH) in which SPS PDSCH transmission exists and requires feedback at the current PUCCH, and for each SPS configuration, if SPS PDSCH transmissions are received in all the found slots, the UE generates 1-bit feedback information corresponding to the SPS configuration.

When the SPS PDSCH transmission corresponding to the SPS configuration is not received or demodulated due to collision with other SPS PDSCH transmissions, the terminal does not provide feedback about the SPS PDSCH corresponding to the SPS configuration. When there are multiple SPS configurations, the feedback information corresponding to the SPS configurations are sequentially concatenated according to SPS configuration numbers, to obtain an HARQ-ACK codebook of one carrier.

When carrier aggregation is utilized, the HARQ-ACK codebooks of all carriers need to be determined separately according to the above process, and finally the HARQ-ACK codebooks of the different carriers are concatenated according to the sequence of the carriers to obtain the final HARQ-ACK codebook.

If the HARQ-ACK codebook also includes the feedback information corresponding to a dynamically scheduled PDSCH or downlink control information (DCI) indicating the SPS PDSCH release, then when the semi-static codebook is configured, the HARQ-ACK codebook is generated according to the determination process of the semi-static HARQ-ACK codebook; when the dynamic codebook is configured, feedback information is generated for the dynamically scheduled PDSCH as dynamic HARQ-ACK codebook, feedback information is generated for the SPS PDSCH according to the above situation where only the SPS PDSCH feedback information is included, and then the two pieces of feedback information are concatenated to obtain the HARQ-ACK codebook.

For the repeatedly transmitted SPS PDSCH, the protocol specifies that the feedback bit position is determined based on the slot where the last transmission in the configured quantity of repeated transmissions is located, that is, for the PDSCH transmitted in slot $n-N_{PDSCH}^{repeat}+1$ to slot n, the feedback is performed in slot n+k, where k is the slot interval between PDSCH and HARQ-ACK determined according to the active DCI or higher layer signaling configuration.

The deficiencies of the related art lie in that: in the case that only HARQ-ACK feedback about the SPS PDSCH is performed, since the last slot of the transmissions of the repeatedly transmitted SPS PDSCH may overlap with other SPS PDSCHs, the feedback information about the repeatedly transmitted SPS PDSCH cannot be included in the corresponding feedback codebook, which will reduce the system transmission efficiency and cause unnecessary retransmissions.

That is, at present, 5G NR at current stage supports simultaneous configuration of multiple SPS configurations in one carrier group, and a situation where multiple SPS PDSCHs overlap with each other may occur. It is stipulated in protocol that the UE only receives or demodulates the SPS PDSCH with the smallest SPS configuration number. For the SPS PDSCH transmission that the UE does not receive or demodulate due to the overlapping, the UE does not provide an HARQ-ACK feedback. For the SPS PDSCH configured to be transmitted repeatedly, if it overlaps with another SPS PDSCH with a smaller number in the last slot of the repeated transmissions, the UE does not provide an HARQ-ACK feedback. However, it is possible that the SPS PDSCH does not overlap with other PDSCHs in a previous slot other than the last slot of the repeated transmissions and may be received or demodulated correctly. Since the feedback bit position of the repeated transmission is determined based on the last transmission in the configured quantity of repeated transmissions in the related art, if the feedback about the last transmission has been excluded from the feedback codebook, then even if the terminal can receive or demodulate the repeated transmissions in a previous slot other than the last slot of the repeated transmissions, the terminal will not be able to provide feedback about the repeated transmissions, which will affect the system transmission efficiency and lead to unnecessary retransmissions by the base station.

FIG. 1 is a schematic diagram illustrating a situation where a repeatedly transmitted SPS PDSCH overlaps with an SPS PDSCH with a smaller number in the last slot of the repeatedly transmitted SPS PDSCH. In the example as shown in the figure, the UE is configured with two SPS PDSCHs. Specifically, there are two repeated transmissions of an SPS PDSCH with a configuration number of 2 in slot 1 and slot 2, and there is also an SPS PDSCH with a configuration number of 1 in slot 2, which overlaps with the SPS PDSCH with the configuration number of 2 in slot 2. In slot 2, the UE only receives the SPS PDSCH with the configuration number of 1 and does not receive or demodulate the SPS PDSCH with the configuration number of 2. Assuming that the configured K1 set of the UE is 1, in the HARQ-ACK feedback in slot n+3, the UE only feeds back 1 bit corresponding to the SPS PDSCH with the configuration number of 1 in slot 2. In other words, the UE can receive the SPS PDSCH transmission in slot 1, but the corresponding feedback bit position is not available in the feedback codebook.

Based on this, embodiments of the present disclosure provide a codebook feedback processing solution, to reserve a feedback bit position in the feedback codebook when there is at least one valid transmission, which will ensure the feedback performance of the repeatedly transmitted SPS PDSCH, improve system transmission efficiency and reduce unnecessary retransmissions.

The specific implementation of the present disclosure will be described below with reference to the accompanying drawings.

In the description, the implementations on the UE and base station sides will be described separately, and then an example of a coordinated implementation will be given to better understand the implementation of the solution given in the embodiments of the present disclosure. This manner of description does not mean that the implementations on the UE and base station sides must be implemented together or must be implemented separately. In fact, when the UE and the base station are implemented separately, they also solve the problems on the UE side and the base station side respectively, and when the two are used in combination, better technical results are achieved.

Figure 2:
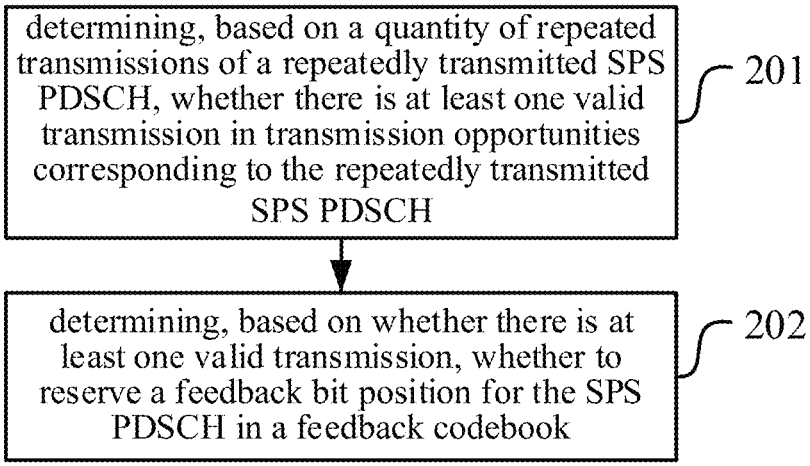
FIG. 2 is a schematic flowchart of a codebook feedback processing method on a terminal side according to an embodiment of the present disclosure.

FIG. 2 is a schematic flowchart of the codebook feedback processing method on the terminal side. As shown in FIG. 2, the method includes:

step 201: determining, based on a quantity of repeated transmissions of a repeatedly transmitted SPS PDSCH, whether there is at least one valid transmission in transmission opportunities corresponding to the repeatedly transmitted SPS PDSCH;

step 202: determining, based on whether there is at least one valid transmission, whether to reserve a feedback bit position for the SPS PDSCH in a feedback codebook.

Figure 3:
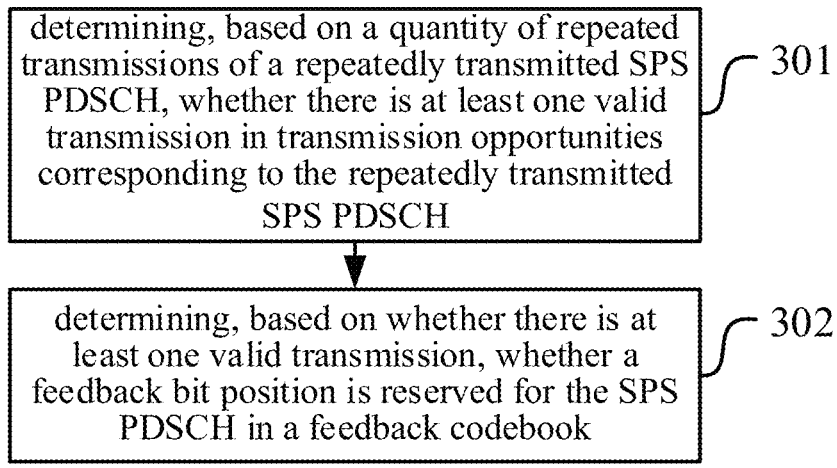
FIG. 3 is a schematic flowchart of a codebook feedback processing method on a base station side according to an embodiment of the present disclosure.

FIG. 3 is a schematic flowchart of the codebook feedback processing method on the base station side. As shown in FIG. 3, the method includes:

step 301: determining, based on a quantity of repeated transmissions of a repeatedly transmitted SPS PDSCH, whether there is at least one valid transmission in transmission opportunities corresponding to the repeatedly transmitted SPS PDSCH;

step 302: determining, based on whether there is at least one valid transmission, whether a feedback bit position is reserved for the SPS PDSCH in a feedback codebook.

Specifically, for a repeatedly transmitted SPS PDSCH, it is determined whether there is at least one valid transmission based on a quantity of repeated transmissions and it is determined whether to reserve a feedback bit position in a feedback codebook.

Since the behavior on the base station side is similar to that on the terminal side, the base station determines whether the repeatedly transmitted SPS PDSCH has at least one valid transmission in the same manner, and then determines whether there is the feedback bit position corresponding to the repeatedly transmitted SPS PDSCH in the received feedback codebook. So, the following description will mainly take the implementation on the terminal side as an example.

In an implementation, the determining, based on the quantity of repeated transmissions, whether there is at least one valid transmission includes one of or a combination of:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

Specifically, the determining, based on the quantity of repeated transmissions, whether there is at least one valid transmission may specifically include:

1. if it is judged that at least one transmission opportunity in all transmission opportunities of the repeatedly transmitted SPS PDSCH is not cancelled by other overlapping SPS PDSCH transmissions, determining that there is at least one valid transmission; or, 2. if it is judged that at least one transmission opportunity in all transmission opportunities of the repeatedly transmitted SPS PDSCH is not cancelled by other overlapping SPS PDSCH transmissions and is not cancelled by the semi-statically configured uplink symbol, determining that there is at least one valid transmission; or, 3. if it is judged that at least one transmission opportunity in all transmission opportunities of the repeatedly transmitted SPS PDSCH is not cancelled due to the transmission capability limitation of the UE, determining that there is at least one valid transmission; or, 4. if it is judged that at least one transmission opportunity in all transmission opportunities of the repeatedly transmitted SPS PDSCH is not cancelled by other overlapping SPS PDSCH transmissions and is not cancelled due to the transmission capability limitation of the UE, determining that there is at least one valid transmission; or, 5. if it is judged that at least one transmission opportunity in all transmission opportunities of the repeatedly transmitted SPS PDSCH is not cancelled by other overlapping SPS PDSCH transmissions and is not cancelled due to the transmission capacity limitation of the UE and is not cancelled by the semi-statically configured uplink symbol, determining that there is at least one valid transmission.

In an implementation, being cancelled by the semi-statically configured uplink symbol means that in a transmission opportunity of the repeatedly transmitted SPS PDSCH, at least one time domain symbol in the time domain symbols occupied by the SPS PDSCH overlaps with the semi-statically configured uplink symbol, then the transmission opportunity of the repeatedly transmitted SPS PDSCH is cancelled by the semi-statically configured uplink symbol.

In an implementation, the being cancelled due to overlapping with other SPS PDSCH transmission may include:

being cancelled due to overlapping with a SPS PDSCH with a smallest configuration number; and/or being cancelled due to overlapping with other SPS PDSCH transmission and based on a predefined principle.

Specifically, the being cancelled by other overlapping SPS PDSCH transmissions refers to the cancellation due to overlapping with the SPS PDSCH with the smallest configuration number. The overlapping includes direct overlapping or indirect overlapping, where the direct overlapping refers to overlapping in terms of time domain symbol with the SPS PDSCH with the smallest configuration number, and the indirect overlapping refers to an overlapping in terms of time domain symbol with an other SPS PDSCH with a configuration number which is not the smallest, and the other SPS PDSCH with the configuration number which is not the smallest further overlapping in terms of time domain symbol with the SPS PDSCH with the smallest configuration number. Or, the being cancelled by other overlapping SPS PDSCH transmissions refers to the cancellation due to overlapping with other SPS PDSCH transmissions and based on a predefined principle, wherein the predefined principle can be:

(1) first, defining all active SPS PDSCHs in one slot as a set Q, and defining a set P as an empty set;

(2) selecting an SPS PDSCH with the smallest configuration number in the set Q, and putting the selected SPS PDSCH with the smallest configuration number into the set P;

(3) removing the selected SPS PDSCH with the smallest configuration number and all SPS PDSCHs that overlap with the SPS PDSCH with the smallest configuration number from the set Q, to generate a new set Q.

(4) repeating step 2 and step 3 until the set Q is empty or a quantity of elements in the set P is greater than or equal to N, N being the maximum quantity of PDSCH transmissions received in one slot that corresponds to the UE capability. The SPS PDSCHs that can be transmitted and the SPS PDSCHs that need to be cancelled in one slot can be selected based on the predefined principle.

In an implementation, the being cancelled due to the transmission capacity limitation of the UE may include: due to the limitation of the transmission capacity of the UE, the maximum quantity of PDSCH transmissions received in one slot may not exceed a defined quantity, and if the quantity of active SPS PDSCH transmissions in one slot exceeds the defined quantity, the UE would opt to receive the SPS PDSCHs with the smallest number and not receive or demodulate the other SPS PDSCH transmissions, where the other SPS PDSCH transmissions that are not received or demodulated by the UE are the SPS PDSCHs cancelled due to the transmission capacity limitation of the UE.

In an implementation, the quantity of repeated transmissions is a quantity of repeated transmissions corresponding to a currently configured SPS PDSCH transmission.

Specifically, since different SPS PDSCH transmissions may correspond to different respective quantities of repeated transmissions, the current SPS PDSCH is configured with a corresponding quantity of repeated transmissions, to avoid the situation where, due to the use of other larger or smaller quantity of repeated transmissions, the corresponding feedback information cannot be included in the feedback codebook or the feedback codebook includes redundant information that does not need to be fed back.

In an implementation, the determining whether to reserve the feedback bit position for the SPS PDSCH in the feedback codebook includes:

in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or, in case that it is determined based on the quantity of repeated transmissions that there is no valid transmission, not reserving a feedback bit position for the repeatedly transmitted SPS PDSCH in the corresponding HARQ-ACK feedback codebook.

Correspondingly, on the base station side, the determining whether the feedback bit position is reserved for the SPS PDSCH in the feedback codebook includes:

in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or, in case that it is determined based on the quantity of repeated transmissions that there is no valid transmission, no feedback bit position is reserved for the repeatedly transmitted SPS PDSCH in the corresponding HARQ-ACK feedback codebook.

Specifically, determining whether to reserve the feedback bit position in the feedback codebook may include:

1. if it is determined based on the quantity of repeated transmissions that there is at least one valid transmission, reserving, in the corresponding HARQ-ACK feedback codebook, 1-bit HARQ-ACK feedback information for the repeatedly transmitted SPS PDSCH;

2. if it is determined based on the quantity of repeated transmissions that there is no valid transmission, not reserving, in the corresponding HARQ-ACK feedback codebook, a feedback bit position for the repeatedly transmitted SPS PDSCH.

In an implementation, the feedback codebook only includes HARQ-ACK feedback information corresponding to an SPS PDSCH transmission.

Specifically, the feedback codebook only includes HARQ-ACK feedback information corresponding to SPS PDSCH transmission. In the case that the semi-static feedback codebook is configured, the feedback codebook only includes HARQ-ACK feedback information corresponding to SPS PDSCH transmission, and does not include feedback information corresponding to dynamically scheduled PDSCH transmission. In the case that the dynamic feedback codebook is configured, the feedback codebook may only include the HARQ-ACK feedback information corresponding to the SPS PDSCH transmission, or may include both the feedback information about the SPS PDSCH transmission and the feedback information about the dynamic PDSCH transmission. At this point, the present disclosure is only directed to the determination of the feedback information about the SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

Specifically, the feedback bit position for the repeatedly transmitted SPS PDSCH is determined based on the slot where the end position of the last transmission in the configured quantity of repeated transmissions is located. That is, for the SPS PDSCH transmitted in slot $n-N_{PDSCH}^{repeat}+1$ to slot n, the feedback is performed in slot n+k, where k is a slot interval between PDSCH and HARQ-ACK determined according to the active DCI or higher layer signaling configuration, $N_{PDSCH}^{repeat}$ is the quantity of repeated transmissions corresponding to the current SPS PDSCH, and the slot n is the uplink slot where the end position of the last transmission in the configured quantity of repeated transmissions of the repeatedly transmitted SPS PDSCH is located.

In an implementation, the feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

Specifically, the feedback information corresponding to the repeatedly transmitted SPS PDSCH is only included in the HARQ-ACK feedback codebook corresponding to the slot of the last transmission in the configured quantity of repeated transmissions. The feedback information corresponding to the repeatedly transmitted SPS PDSCH is not included in an HARQ-ACK feedback codebook corresponding to a slot of transmission other than the last transmission.

Embodiments are described as below.

Embodiment 1

In this example, a repeatedly transmitted SPS PDSCH overlaps with an SPS PDSCH with a smaller number in the last slot.

Figure 4:
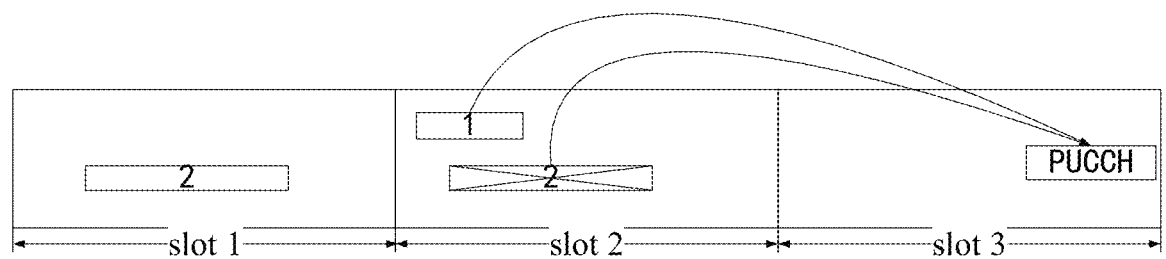
FIG. 4 is a schematic diagram illustrating SPS PDSCH overlapping according to an embodiment 1 of the present disclosure.

FIG. 4 is a schematic diagram of SPS PDSCH overlapping in embodiment 1. As shown in the figure, the UE is configured with two SPS PDSCHs, and the configured quantity of repeated transmissions for the SPS PDSCH with a configuration number of 1 is 1, while the configured quantity of repeated transmissions for the SPS PDSCH with a configuration number of 2 is 2. There are two repeated transmissions of the SPS PDSCH with the configuration number of 2 in slot 1 and slot 2, and there is also a SPS PDSCH with the configuration number of 1 in slot 2, which overlaps with the SPS PDSCH with the configuration number of 2 in slot 2. In slot 2, the UE only receives the SPS PDSCH with the configuration number of 1, and does not receive or demodulate the SPS PDSCH with the configuration number of 2.

Case 1

Assuming that the configured K1 set of the UE is 1, slot 1 and slot 2 are downlink slots, and slot 3 is an uplink slot; the terminal determines based on K1 that the downlink transmission slot corresponding to slot 3 is slot 2. Since there are two SPS PDSCH transmissions in slot 2, and the SPS PDSCH transmission with the configuration number of 2 is a repeated transmission, it is determined that the terminal can receive the SPS PDSCH with the configuration number of 2 in slot 1, then the HARQ-ACK feedback codebook corresponding to slot 3 needs to include the corresponding feedback about the two SPS PDSCHs in slot 2, that is, there are two bits in the feedback codebook, where the first bit corresponds to the SPS PDSCH with the configuration number of 1 in slot 2, and the second bit corresponds to the SPS PDSCH with the configuration number of 2 (actually the SPS PDSCH with the configuration number of 2 received in slot 1).

Case 2

Assuming that the configured K1 set of the UE is 1, slot 2 is a downlink slot, and slot 1 and slot 3 are uplink slots; the terminal determines based on K1 that the downlink transmission slot corresponding to slot 3 is slot 2. Since there are two SPS PDSCH transmissions in slot 2, and the SPS PDSCH transmission with the configuration number of 2 is a repeated transmission, it is determined that the terminal cannot receive the SPS PDSCH with the configuration number of 1 due to a collision with the semi-statically configured uplink symbol in slot 1.

Case 2-1: if the SPS PDSCH transmission that collides with the semi-static uplink symbol needs to be excluded from the feedback codebook, then the HARQ-ACK feedback codebook corresponding to slot 3 only includes the corresponding feedback about the SPS PDSCH with the configuration number of 1 in slot 2, that is, there is 1 bit in the feedback codebook.

Case 2-2: if the SPS PDSCH transmission that collides with the semi-static uplink symbols does not need to be excluded from the feedback codebook, then the HARQ-ACK feedback codebook corresponding to slot 3 needs to include the corresponding feedback about the two SPS PDSCHs in slot 2, that is, there are two bits in the feedback codebook, where the first bit corresponds to the SPS PDSCH with the configuration number of 1 in slot 2, and the second bit corresponds to the SPS PDSCH with the configuration number of 2 in slot 2.

It should be noted that it is assumed that the last 3 symbols in slot 2 are uplink symbols and valid PUCCH resources exist, although the corresponding PDSCH transmission slot 1 can be found based on K1, and there is a valid SPS PDSCH transmission in slot 1 that can be received by the UE, that is, it does not collide with the semi-statically configured uplink symbols, nor does it overlap with other SPS PDSCH transmissions, the UE does not need to provide feedback about the SPS PDSCH transmission of slot 1 in slot 2. This is because the SPS PDSCH transmission with the configuration number of 2 in slot 1 is not the last transmission opportunity determined based on the configured quantity of repeated transmissions, so it will not be included in the feedback codebook of slot 2.

Embodiment 2

In this example, multiple SPS PDSCHs with different quantities of repeated transmissions overlap.

Figure 5:
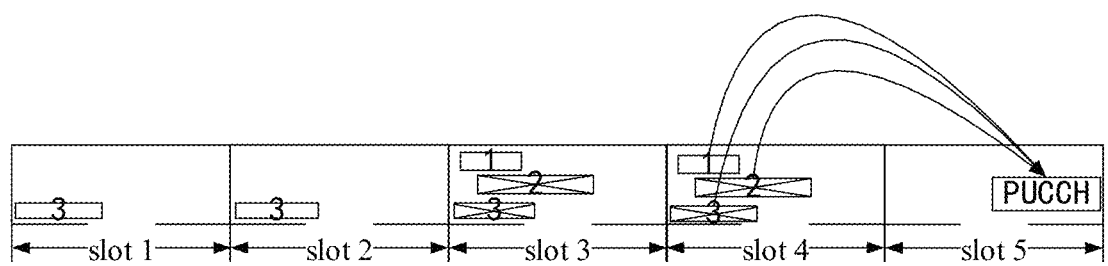
FIG. 5 is a schematic diagram illustrating SPS PDSCH overlapping according to an embodiment 2 of the present disclosure.

FIG. 5 is a schematic diagram of SPS PDSCH overlapping in embodiment 2. As shown in the figure, the UE is configured with three SPS PDSCHs, wherein the configured quantity of repeated transmissions for the SPS PDSCH with a configuration number of 1 and the SPS PDSCH with a configuration number of 2 is 2, and the configured quantity of repeated transmissions for the SPS PDSCH with a configuration number of 3 is 4. Both the SPS PDSCH with the configuration number of 1 and the SPS PDSCH with the configuration number of 2 are repeatedly transmitted twice in slot 3 and slot 4, and the SPS PDSCH with the configuration number of 3 is repeatedly transmitted four times in slots 1 to 4. The UE only receives the SPS PDSCH with the configuration number of 1 in slot 3 and slot 4, and does not receive or demodulate the SPS PDSCH with the configuration number of 2 and the SPS PDSCH with the configuration number of 3.

Assuming that the configured K1 set of the UE is 1, slots 1 to 4 are downlink slots, and slot 5 is an uplink slot; the terminal determines based on K1 that the downlink transmission slot corresponding to slot 5 is slot 4. Since there are three SPS PDSCH transmissions in slot 4, all of which are repeated transmissions, it is determined that the terminal can receive the SPS PDSCH with the configuration number of 1 in slot 4; the SPS PDSCH with the configuration number of 2 cannot be received in slot 3, so the SPS PDSCH with the configuration number of 2 does not have a valid transmission opportunity; the SPS PDSCH with the configuration number of 3 cannot be received in slot 3, but can be received in slot 1 and slot 2, then the SPS PDSCH with the configuration number of 3 has valid transmission opportunities.

Therefore, the HARQ-ACK feedback codebook corresponding to slot 5 needs to include the corresponding feedback about the SPS PDSCH with the configuration number of 1 and the SPS PDSCH with the configuration number of 3 in slot 4, that is, there are two bits in the feedback codebook, where the first bit corresponds to the SPS PDSCH with the configuration number of 1 (actually the SPS PDSCH with the configuration number of 1 received in slot 3 and slot 4), and the second bit corresponds to the SPS PDSCH with the configuration number of 3 (actually the SPS PDSCH with the configuration number of 3 received in slot 1 and slot 2).

Based on the same inventive concept, embodiments of the present disclosure also provide a base station, a terminal, a codebook feedback processing apparatus and a computer-readable storage medium. Since the problem-solving principle of these devices is similar to the codebook feedback processing methods, for the implementation of these devices, references can be made to the implementations of the methods, which will not be repeated here.

The technical solution provided by the embodiments of the present disclosure can be implemented as follows.

Figure 6:
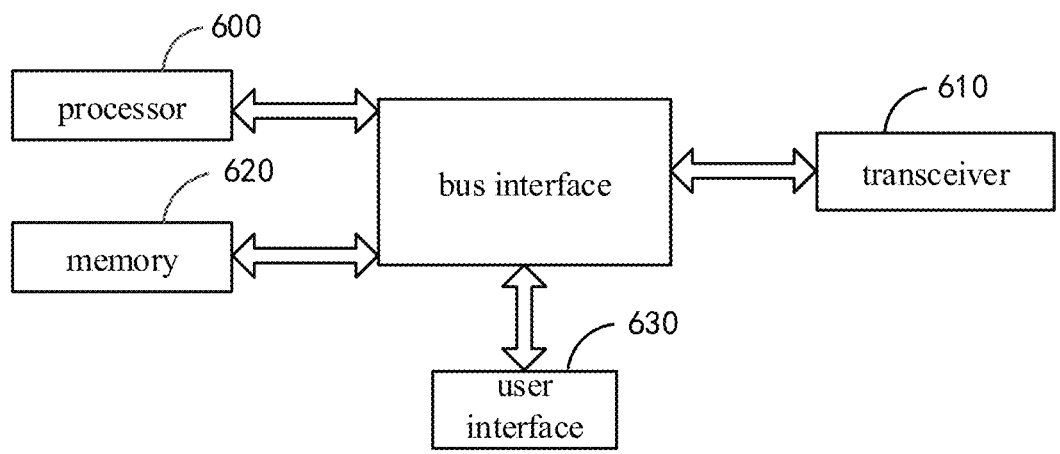
FIG. 6 is a schematic structural diagram of a terminal according to an embodiment of the present disclosure.

FIG. 6 is a schematic structural diagram of a terminal. As shown in the figure, the terminal includes:

a processor 600, configured to read a program in a memory 620, to implement the following process:

determining, based on a quantity of repeated transmissions of a repeatedly transmitted SPS PDSCH, whether there is at least one valid transmission in transmission opportunities corresponding to the repeatedly transmitted SPS PDSCH;

determining, based on whether there is at least one valid transmission, whether to reserve a feedback bit position for the SPS PDSCH in a feedback codebook.

a transceiver 610, configured to receive and transmit data under the control of the processor 600.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether to reserve the feedback bit position for the SPS PDSCH in the feedback codebook includes:

in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or, in case that it is determined based on the quantity of repeated transmissions that there is no valid transmission, not reserving a feedback bit position for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

In FIG. 6, the bus architecture may include any quantity of interconnected buses and bridges, specifically various circuits such as one or more processors represented by the processor 600 and a memory represented by the memory 620 are connected together. The bus architecture can also connect various other circuits such as peripheral devices, voltage regulators, power management circuits, etc., which are all known in the field, and therefore, will not be further described herein. The bus interface provides the interface. The transceiver 610 may be a plurality of elements, that is, including a transmitter and a receiver, and provide a unit for communicating with various other devices on the transmission medium. For different user equipment, the user interface 630 may also be an interface capable of connecting externally or internally to a required device. The connected device includes, but is not limited to: a keypad, a display, a speaker, a microphone, a joystick, etc.

The processor 600 is responsible for managing the bus architecture and general processing, and the memory 620 can store data used by the processor 600 during performing operations.

An embodiment of the present disclosure provides a codebook feedback processing apparatus, including:

a valid transmission determination module, configured to determine, based on a quantity of repeated transmissions of a repeatedly transmitted SPS PDSCH, whether there is at least one valid transmission in transmission opportunities corresponding to the repeatedly transmitted SPS PDSCH;

a reservation module, configured to determine, based on whether there is at least one valid transmission, whether to reserve a feedback bit position for the SPS PDSCH in a feedback codebook.

For specific implementations of the codebook feedback processing apparatus, references may be made to the implementations of the codebook feedback processing method on the terminal side.

For the convenience of description, parts of the above apparatus are divided into various modules or units by function and are described separately. Of course, when implementing the present disclosure, the functions of the modules or units may be implemented in a single piece or multiple pieces of software or hardware.

Figure 7:
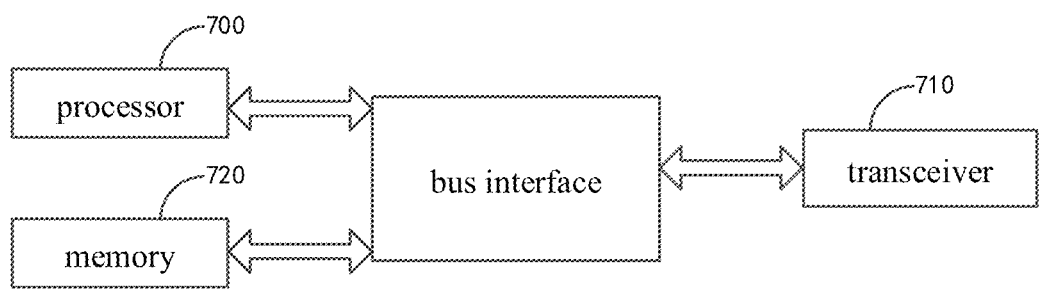
FIG. 7 is a schematic structural diagram of a base station according to an embodiment of the present disclosure.

FIG. 7 is a schematic structural diagram of a base station. As shown in the figure, the base station includes:

a processor 700, configured to read a program in a memory 720, to implement the following process:

determining, based on a quantity of repeated transmissions of a repeatedly transmitted SPS PDSCH, whether there is at least one valid transmission in transmission opportunities corresponding to the repeatedly transmitted SPS PDSCH;

determining, based on whether there is at least one valid transmission, whether a feedback bit position is reserved for the SPS PDSCH in a feedback codebook;

a transceiver 710, configured to receive and transmit data under the control of the processor 700.

In an implementation, the determining, based on the quantity of repeated transmissions, whether there is at least one valid transmission includes one of or a combination of the following:

determining that there is at least one valid transmission in case that at least one transmission in all transmission opportunities of the repeatedly transmitted SPS PDSCH is not cancelled due to overlapping with other SPS PDSCH transmission; or, determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or, determining that there is at least one valid transmission in case that at least one transmission in all transmission opportunities of the repeatedly transmitted SPS PDSCH is not cancelled due to a user equipment transmission capability limitation.

In an implementation, the quantity of repeated transmissions is a quantity of repeated transmissions corresponding to a currently configured SPS PDSCH transmission.

In an implementation, the being cancelled due to overlapping with other SPS PDSCH transmission includes:

being cancelled due to overlapping with a SPS PDSCH with a smallest configuration number; and/or being cancelled due to overlapping with other SPS PDSCH transmission and based on a predefined principle.

In an implementation, the determining whether the feedback bit position is reserved for the SPS PDSCH in the feedback codebook includes:

in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or, in case that it is determined based on the quantity of repeated transmissions that there is no valid transmission, no feedback bit position is reserved for the repeatedly transmitted SPS PDSCH in the corresponding HARQ-ACK feedback codebook.

In an implementation, the feedback codebook only includes HARQ-ACK feedback information corresponding to a SPS PDSCH transmission.

In an implementation, a slot position where a feedback codebook for the repeatedly transmitted SPS PDSCH is located is a feedback slot position determined based on an end position of a last transmission in a configured quantity of repeated transmissions of the repeatedly transmitted SPS PDSCH.

In an implementation, feedback information corresponding to the repeatedly transmitted SPS PDSCH is included in an HARQ-ACK feedback codebook corresponding to a slot where a last transmission in a configured quantity of repeated transmissions of the repeatedly transmitted SPS PDSCH is located.

In FIG. 7, the bus architecture may include any quantity of interconnected buses and bridges, specifically various circuits such as one or more processors represented by the processor 700 and a memory represented by the memory 720 are connected together. The bus architecture can also connect various other circuits such as peripheral devices, voltage regulators, power management circuits, etc., which are all known in the field, and therefore, will not be further described herein. The bus interface provides the interface. The transceiver 710 may be a plurality of elements, that is, including a transmitter and a receiver, and provide a unit for communicating with various other devices on the transmission medium. The processor 700 is responsible for managing the bus architecture and general processing, and the memory 720 can store data used by the processor 700 during performing operations.

An embodiment of the present disclosure provides a codebook feedback processing apparatus, including:

a determination module, configured to determine, based on a quantity of repeated transmissions of a repeatedly transmitted SPS PDSCH, whether there is at least one valid transmission in transmission opportunities corresponding to the repeatedly transmitted SPS PDSCH;

a reservation determination module, configured to determine, based on whether there is at least one valid transmission, whether a feedback bit position is reserved for the SPS PDSCH in a feedback codebook.

For specific implementations of the codebook feedback processing apparatus, references may be made to the implementations of the codebook feedback processing method on the base station side.

For the convenience of description, parts of the above apparatus are divided into various modules or units by function and are described separately. Of course, when implementing the present disclosure, the functions of the modules or units may be implemented in a single piece or multiple pieces of software or hardware.

An embodiment of the present disclosure provides a computer-readable storage medium storing a computer program, wherein the computer program is configured to be executed to implement the above codebook feedback processing methods.

For specific implementations thereof, references can be made to the implementations of the codebook feedback processing method on the terminal side and/or base station side.

To sum up, in the technical solutions provided by the embodiments of the present disclosure, for a repeatedly transmitted SPS PDSCH, it is determined whether there is at least one valid transmission based on a quantity of repeated transmissions and it is determined whether to reserve a feedback bit position in a feedback codebook.

By adopting the feedback solution about the repeatedly transmitted SPS PDSCH, when there is at least one valid transmission, a feedback bit position is reserved in the feedback codebook, thereby ensuring the feedback performance of the repeatedly transmitted SPS PDSCH, improving the system transmission efficiency and reducing the unnecessary retransmissions.

A person skilled in the art can understand that embodiments of the present disclosure may be provided as a method, system, or computer program product. Accordingly, the present disclosure may take the form of an entirely hardware embodiment, an entirely software embodiment, or an embodiment combining software and hardware aspects. Furthermore, the present disclosure may take the form of a computer program product implemented on one or more computer-usable storage media storing computer-usable program codes (including but not limited to magnetic disk storage, optical storage, etc.).

The present disclosure is described with reference to flowcharts and/or block diagrams of methods, apparatus (systems), and computer program products according to the embodiments of the disclosure. It will be understood that each process and/or block in the flowcharts and/or block diagrams, and combinations of processes and/or blocks in the flowcharts and/or block diagrams, can be implemented by computer program instructions. These computer program instructions may be provided to the processor of a general-purpose computer, special purpose computer, embedded processor or other programmable data processing device to produce a machine such that the instructions executed by the processor of the computer or other programmable data processing device produce an apparatus for implementing the functions specified in one or more processes in the flowcharts and/or one or more blocks in the block diagrams.

These computer program instructions may also be stored in a computer readable memory capable of directing a computer or other programmable data processing device to operate in a particular manner, such that the instructions stored in the computer readable memory produce an article of manufacture including an instruction device that implements the functions specified in one or more processes in a flowchart and/or one or more blocks in a block diagram.

These computer program instructions may also be loaded into a computer or other programmable data processing device such that a series of operational steps are executed on the computer or other programmable device to produce computer-implemented processing, so that the instructions executed on the computer or other programmable device provide steps for implementing the functions specified in in one or more processes in a flowchart and/or one or more blocks in a block diagram.

The terms "first", "second", etc. in the description and claims of the present disclosure are used to distinguish similar objects and are not necessarily used to describe a specific order or sequence. It should be understood that the data so used may be interchanged under appropriate circumstances so that the embodiments of the application described herein, such as those illustrated or described herein, are implemented in sequences other than those illustrated or described herein. Furthermore, the terms "comprising" and "having", and any variations thereof, are intended to cover non-exclusive inclusion, for example, a process, method, system, product or device comprising a series of steps or units is not necessarily limited to those steps or units clearly listed, but may include other steps or units not clearly listed or inherent to those processes, methods, products, or devices. In addition, the specification and claims use "and/or" to denote at least one of the connected objects, e.g., A and/or B and/or C, to indicate the seven cases comprising A alone, B alone, C alone, and both A and B, both B and C, both A and C, and all of A, B, and C. Similarly, the use of "at least one of A and B" in this specification and in the claims is to be understood as "A alone, B alone, or both A and B".

The above are optional implementations of the present disclosure. It should be pointed out that for a person skilled in the art, several improvements and modifications can be made without departing from the principles of the present disclosure. The present disclosure intends to encompass these improvements and modifications if they fall within the scope of the claims of the present disclosure and equivalents thereof.

What is claimed is:

1. A codebook feedback processing method, comprising:
    determining, by a terminal, based on a quantity of repeated transmissions of a repeatedly transmitted semi-persistent scheduling (SPS) physical downlink shared channel (PDSCH), whether there is at least one valid transmission in transmission opportunities corresponding to the repeatedly transmitted SPS PDSCH;
    determining, by the terminal, based on whether there is at least one valid transmission, whether to reserve a feedback bit position for the SPS PDSCH in a feedback codebook.

2. The codebook feedback processing method according to claim 1, wherein the determining, based on the quantity of repeated transmissions, whether there is at least one valid transmission comprises one of or a combination of the following:
    determining that there is at least one valid transmission in case that at least one transmission in all transmission opportunities of the repeatedly transmitted SPS PDSCH is not cancelled due to overlapping with other SPS PDSCH transmission; or,
    determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or,
    determining that there is at least one valid transmission in case that at least one transmission in all transmission opportunities of the repeatedly transmitted SPS PDSCH is not cancelled due to a user equipment transmission capability limitation.

3. The codebook feedback processing method according to claim 2, wherein the being cancelled due to overlapping with other SPS PDSCH transmission comprises:
    being cancelled due to overlapping with a SPS PDSCH with a smallest configuration number; and/or
    being cancelled due to overlapping with other SPS PDSCH transmission and based on a predefined principle.

4. The codebook feedback processing method according to claim 1, wherein the quantity of repeated transmissions is a quantity of repeated transmissions corresponding to a currently configured SPS PDSCH transmission;
    and/or,
    wherein, a slot position where a feedback codebook for the repeatedly transmitted SPS PDSCH is located is a feedback slot position determined based on an end position of a last transmission in a configured quantity of repeated transmissions of the repeatedly transmitted SPS PDSCH;
    and/or,
    wherein, feedback information corresponding to the repeatedly transmitted SPS PDSCH is comprised in an HARQ-ACK feedback codebook corresponding to a slot where a last transmission in a configured quantity of repeated transmissions of the repeatedly transmitted SPS PDSCH is located.

5. The codebook feedback processing method according to claim 1, wherein the determining whether to reserve the feedback bit position for the SPS PDSCH in the feedback codebook comprises:
    in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or,
    in case that it is determined based on the quantity of repeated transmissions that there is no valid transmission, not reserving a feedback bit position for the repeatedly transmitted SPS PDSCH in the corresponding HARQ-ACK feedback codebook.

6. The codebook feedback processing method according to claim 1, wherein the feedback codebook only comprises HARQ-ACK feedback information corresponding to a SPS PDSCH transmission.

7. A codebook feedback processing method, comprising:
    determining, by a base station, based on a quantity of repeated transmissions of a repeatedly transmitted SPS PDSCH, whether there is at least one valid transmission in transmission opportunities corresponding to the repeatedly transmitted SPS PDSCH;

determining, by the base station, based on whether there is at least one valid transmission, whether a feedback bit position is reserved for the SPS PDSCH in a feedback codebook.

8. The codebook feedback processing method according to claim 7, wherein the determining, based on the quantity of repeated transmissions, whether there is at least one valid transmission comprises one of or a combination of the following:
determining that there is at least one valid transmission in case that at least one transmission in all transmission opportunities of the repeatedly transmitted SPS PDSCH is not cancelled due to overlapping with other SPS PDSCH transmission; or,
determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or,
determining that there is at least one valid transmission in case that at least one transmission in all transmission opportunities of the repeatedly transmitted SPS PDSCH is not cancelled due to a user equipment transmission capability limitation.

9. The codebook feedback processing method according to claim 8, wherein the being cancelled due to overlapping with other SPS PDSCH transmission comprises:
being cancelled due to overlapping with a SPS PDSCH with a smallest configuration number; and/or
being cancelled due to overlapping with other SPS PDSCH transmission and based on a predefined principle.

10. The codebook feedback processing method according to claim 7, wherein the quantity of repeated transmissions is a quantity of repeated transmissions corresponding to a currently configured SPS PDSCH transmission;
and/or,
wherein the feedback codebook only comprises HARQ-ACK feedback information corresponding to a SPS PDSCH transmission.

11. The codebook feedback processing method according to claim 7, wherein, the determining whether the feedback bit position is reserved for the SPS PDSCH in the feedback codebook comprises:
in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or,
in case that it is determined based on the quantity of repeated transmissions that there is no valid transmission, no feedback bit position is reserved for the repeatedly transmitted SPS PDSCH in the corresponding HARQ-ACK feedback codebook.

12. A terminal, comprising:
a processor, configured to read a program in a memory to implement the following process:
determining, based on a quantity of repeated transmissions of a repeatedly transmitted SPS PDSCH, whether there is at least one valid transmission in transmission opportunities corresponding to the repeatedly transmitted SPS PDSCH;
determining, based on whether there is at least one valid transmission, whether to reserve a feedback bit position for the SPS PDSCH in a feedback codebook;

a transceiver, configured to receive and transmit data under the control of the processor.

13. The terminal according to claim 12, wherein the determining, based on the quantity of repeated transmissions, whether there is at least one valid transmission comprises one of or a combination of the following:
determining that there is at least one valid transmission in case that at least one transmission in all transmission opportunities of the repeatedly transmitted SPS PDSCH is not cancelled due to overlapping with other SPS PDSCH transmission; or,
determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or,
determining that there is at least one valid transmission in case that at least one transmission in all transmission opportunities of the repeatedly transmitted SPS PDSCH is not cancelled due to a user equipment transmission capability limitation.

14. The terminal according to claim 13, wherein the being cancelled due to overlapping with other SPS PDSCH transmission comprises:
being cancelled due to overlapping with a SPS PDSCH with a smallest configuration number; and/or
being cancelled due to overlapping with other SPS PDSCH transmission and based on a predefined principle.

15. The terminal according to claim 12, wherein the quantity of repeated transmissions is a quantity of repeated transmissions corresponding to a currently configured SPS PDSCH transmission;
and/or,
wherein the feedback codebook only comprises HARQ-ACK feedback information corresponding to a SPS PDSCH transmission;
and/or,
wherein, a slot position where a feedback codebook for the repeatedly transmitted SPS PDSCH is located is a feedback slot position determined based on an end position of a last transmission in a configured quantity of repeated transmissions of the repeatedly transmitted SPS PDSCH;
and/or,
wherein, feedback information corresponding to the repeatedly transmitted SPS PDSCH is comprised in an HARQ-ACK feedback codebook corresponding to a slot where a last transmission in a configured quantity of repeated transmissions of the repeatedly transmitted SPS PDSCH is located.

16. The terminal according to claim 12, wherein the determining whether to reserve the feedback bit position for the SPS PDSCH in the feedback codebook comprises:
in case that it is determined based on the quantity of repeated transmissions that there is at least one valid transmission, reserving a 1-bit HARQ-ACK feedback information position for the repeatedly transmitted SPS PDSCH in a corresponding HARQ-ACK feedback codebook; or,
in case that it is determined based on the quantity of repeated transmissions that there is no valid transmission, not reserving a feedback bit position for the repeatedly transmitted SPS PDSCH in the corresponding HARQ-ACK feedback codebook.

17. A base station, comprising:
- a processor, configured to read a program in a memory to implement steps of the method according to claim 7;
- a transceiver, configured to receive and transmit data under the control of the processor.

18. The base station according to claim 17, wherein the determining, based on the quantity of repeated transmissions, whether there is at least one valid transmission comprises one of or a combination of the following:
- determining that there is at least one valid transmission in case that at least one transmission in all transmission opportunities of the repeatedly transmitted SPS PDSCH is not cancelled due to overlapping with other SPS PDSCH transmission; or,
- determining that there is at least one valid transmission in case that at least one transmission in all transmission opportunities of the repeatedly transmitted SPS PDSCH is not cancelled due to overlapping with other SPS PDSCH transmission and is not cancelled by a semi-statically configured uplink symbol; or,
- determining that there is at least one valid transmission in case that at least one transmission in all transmission opportunities of the repeatedly transmitted SPS PDSCH is not cancelled due to a user equipment transmission capability limitation.

19. The base station according to claim 18, wherein the being cancelled due to overlapping with other SPS PDSCH transmission comprises:
- being cancelled due to overlapping with a SPS PDSCH with a smallest configuration number; and/or
- being cancelled due to overlapping with other SPS PDSCH transmission and based on a predefined principle.

20. The base station according to claim 17, wherein the quantity of repeated transmissions is a quantity of repeated transmissions corresponding to a currently configured SPS PDSCH transmission;

and/or, wherein the feedback codebook only comprises HARQ-ACK feedback information corresponding to a SPS PDSCH transmission;

and/or, wherein, the determining whether the feedback bit position is reserved for the SPS PDSCH in the feedback codebook comprises:
- in case that it is determined based on the quantity of repeated transmissions that there is at least one valid transmission, a 1-bit HARQ-ACK feedback information position is reserved for the repeatedly transmitted SPS PDSCH in a corresponding HARQ-ACK feedback codebook; or,
- in case that it is determined based on the quantity of repeated transmissions that there is no valid transmission, no feedback bit position is reserved for the repeatedly transmitted SPS PDSCH in the corresponding HARQ-ACK feedback codebook.

\* \* \* \* \*